(12) United States Patent
Singh et al.

(10) Patent No.: US 10,697,339 B2
(45) Date of Patent: Jun. 30, 2020

(54) USING ELECTROMAGNETIC WAVES AND/OR INJECTION TO FACILITATE OPERATION OF CATALYTIC CONVERTERS

(71) Applicant: Great Lakes Pollution Control, Inc., Iowa City, IA (US)

(72) Inventors: Gurjap Singh, Iowa City, IA (US); Albert Ratner, Iowa City, IA (US)

(73) Assignee: Great Lakes Pollution Control, Inc., Iowa City, IA (US)

( * ) Notice: Subject to any disclaimer, the term of this patent is extended or adjusted under 35 U.S.C. 154(b) by 10 days.

(21) Appl. No.: 16/230,885

(22) Filed: Dec. 21, 2018

(65) Prior Publication Data

US 2019/0120108 A1    Apr. 25, 2019

Related U.S. Application Data

(63) Continuation of application No. PCT/US2017/039838, filed on Jun. 28, 2017.

(Continued)

(51) Int. Cl.
*F01N 3/20* (2006.01)
*F01N 3/028* (2006.01)
(Continued)

(52) U.S. Cl.
CPC .............. *F01N 3/202* (2013.01); *F01N 3/027* (2013.01); *F01N 3/028* (2013.01); *F01N 3/2013* (2013.01);
(Continued)

(58) Field of Classification Search
CPC .............. F01N 11/002; F01N 2610/00; F01N 2610/14; F01N 3/027; F01N 3/028;
(Continued)

(56) References Cited

U.S. PATENT DOCUMENTS 5,180,559 A * 1/1993 Ma .......................... F01N 3/202
                                                              422/168
5,569,441 A * 10/1996 Engler ................. B01D 53/007
                                                              423/212

(Continued)

FOREIGN PATENT DOCUMENTS

| EP | 0608752 A1 | 8/1994 |
|---|---|---|
| JP | H0734849 B2 | 4/1995 |
| JP | H07217425 | 8/1995 |

OTHER PUBLICATIONS

International Search Report & Written Opinion, PCT/US2017/039838, dated Sep. 15, 2017, 11 Pages.

*Primary Examiner* — Jesse S Bogue
(74) *Attorney, Agent, or Firm* — Goodhue, Coleman & Owens, P.C.

(57) ABSTRACT

A system includes an exhaust conduit coupled, at least first end of the exhaust conduit, to an internal combustion; a catalytic converter coupled to a second end of the exhaust conduit; and electromagnetic wave source configured to emit electromagnetic energy; and a wave guide, coupled at a first end to the electromagnetic wave source and at a second end to the exhaust conduit, and extending between the electromagnetic wave source and the exhaust conduit. The electromagnetic wave source is configured to provide the electromagnetic energy, via the wave guide, to exhaust gas traveling through the exhaust conduit.

18 Claims, 4 Drawing Sheets

Related U.S. Application Data (60) Provisional application No. 62/356,082, filed on Jun. 29, 2016.

(51) Int. Cl.
 *F01N 3/027* (2006.01)
 *F01N 11/00* (2006.01)

(52) U.S. Cl.
 CPC .......... *F01N 3/2066* (2013.01); *F01N 11/002* (2013.01); *F01N 2610/00* (2013.01); *F01N 2610/14* (2013.01); *Y02A 50/2325* (2018.01); *Y02T 10/24* (2013.01); *Y02T 10/26* (2013.01)

(58) Field of Classification Search
 CPC ...... F01N 3/2013; F01N 3/202; F01N 3/2066; Y02A 50/2325; Y02T 10/24; Y02T 10/26
 See application file for complete search history.

(56) References Cited

U.S. PATENT DOCUMENTS

| | | | |
|---|---|---|---|
| 6,131,386 A * | 10/2000 | Trumble | F01N 3/202 333/135 |
| 6,969,492 B1 * | 11/2005 | Goerigk | F01N 3/2066 422/177 |
| 7,691,339 B2 * | 4/2010 | Ament | B01D 53/9431 422/171 |
| 10,066,525 B2 * | 9/2018 | Hoki | F01N 3/202 |
| 10,603,617 B2 * | 3/2020 | Imada | F01N 9/002 |
| 2002/0069756 A1 * | 6/2002 | Mako | F01N 3/028 95/148 |
| 2009/0071110 A1 | 3/2009 | Gonze et al. | |
| 2010/0031637 A1 * | 2/2010 | Saloka | F01N 3/202 60/286 |
| 2011/0146254 A1 | 6/2011 | Yi et al. | |
| 2011/0239631 A1 | 10/2011 | Bui et al. | |
| 2016/0363022 A1 * | 12/2016 | Hoki | F01N 3/035 |

* cited by examiner

USING ELECTROMAGNETIC WAVES AND/OR INJECTION TO FACILITATE OPERATION OF CATALYTIC CONVERTERS

CROSS-REFERENCE TO RELATED APPLICATIONS

This application is a continuation of International Application No. PCT/US17/39838, filed Jun. 28, 2017, which claims the benefits of U.S. Provisional Application No. 62/356,082, filed Jun. 29, 2016, both entitled "Using Electromagnetic Waves and/or Injection to Facilitate Operation of Catalytic Converters," which are both incorporated by reference herein in their entity.

TECHNICAL FIELD

The present invention relates to catalytic converters. More particularly, but not exclusively, the present invention relates to using electromagnetic radiation to facilitate operation of catalytic converters.

BACKGROUND

Internal Combustion (IC) Engines (used in automobiles of all kinds and designs) require catalytic converters by law to clean up their emissions. Every catalytic converter has an optimum temperature beyond which it is able to effectively convert unburned hydrocarbons (UHCs), various oxides of nitrogen (NOx) and carbon monoxide (CO) in the exhaust gas to relatively harmless components like water, nitrogen and carbon dioxide. The present catalytic converters need time (called "light-off time") to attain the desired temperature at which they become operational. During this time they are unable to treat exhaust gas, resulting in environmentally harmful emissions. Catalytic converters were optimized to exhaust gas temperatures associated with designs in the 1970's, 1980's, and 1990's, which were significantly higher than today's high efficiency, computer controlled engines. Thus, light-off times for such catalytic converters are higher and they run colder. Because catalytic converter efficiency is a function of temperature this means that today's catalytic converters run at lower efficiencies. This increased light-off time becomes an even more significant problem when the engine is run for relatively short duration, such as a short vehicle trip, such that the light-off time is a significant amount of the duration. Thus, there is a need to develop new catalysts for modern and future catalytic converters which will operate well at lower temperatures and conform to ever-more stringent pollution regulations.

One approach has been to use add-ons like pre-cats to reduce light-off time but this approach is expensive and not always reliable. What is needed are new and innovative methods, apparatus, and systems to improve the operation of catalytic converters.

SUMMARY

Embodiments of the invention include using electromagnetic energy (e.g., microwave energy, RF energy, etc.) to heat exhaust gases prior to introducing the exhaust gases to a catalytic converter to facilitate reactions. In embodiments, an injection substance (e.g., a reducing agent such as, for example, urea) may be injected into the exhaust gases to further facilitate reaction.

In an Example 1, a system, comprising: an exhaust conduit coupled, at a first end of the exhaust conduit, to an internal combustion engine; a catalytic converter coupled to a second end of the exhaust conduit; an electromagnetic wave source configured to emit electromagnetic energy; and a wave guide, coupled at a first end to the electromagnetic wave source and at a second end to the exhaust conduit, and extending between the electromagnetic wave source and the exhaust conduit, wherein the electromagnetic wave source is configured to provide the electromagnetic energy, via the wave guide, to exhaust gas traveling through the exhaust conduit.

In an Example 2, the system of Example 1, further comprising mesh material disposed within the exhaust conduit to contain the electromagnetic energy within the exhaust conduit.

In an Example 3, the system of Example 2, wherein a first portion of the mesh material is positioned upstream of the location at which the wave guide is coupled to the exhaust conduit; and a second portion of the mesh material is positioned downstream of the location at which the wave guide is coupled to the exhaust conduit.

In an Example 4, the system of any of Examples 1-3, further comprising an injector positioned upstream of the location at which the wave guide is coupled to the exhaust conduit, wherein the injector is configured to inject an injection substance into the exhaust conduit.

In an Example 5, the system of Example 4, further comprising: a first portion of mesh material disposed within the exhaust conduit and upstream of a location at which the wave guide is coupled to the exhaust conduit; and a second portion of the mesh material disposed is within the exhaust conduit and downstream of the location at which the wave guide is coupled to the exhaust conduit; wherein the injector is positioned to inject the injection substance into the exhaust conduit downstream of the first portion of mesh material.

In an Example 6, the system of either of Examples 4 or 5, wherein the injection substance is a reducing agent.

In an Example 7, the system of Example 6, wherein the reducing agent comprises urea.

In an Example 8, the system of any of Examples 1-7, further comprising an additional electromagnetic wave source coupled, via an additional wave guide, to the exhaust conduit.

In an Example 9, the system of Example 8, wherein the second electromagnetic wave source comprises at least one of a visible light source, an infrared light source, and a radio frequency (RF) wave source.

In an Example 10, the system of any of Examples 1-9, wherein the electromagnetic energy comprises microwave energy.

In an Example 11, the system of Example 10, wherein the electromagnetic wave source comprises a magnetron.

In an Example 12, an exhaust processing system for use with a catalytic converter that is configured to receive exhaust gas via an exhaust conduit, the system comprising: an injector positioned along the exhaust conduit and configured to inject an injection substance into the exhaust conduit; and an electromagnetic wave source configured to emit electromagnetic energy; and a wave guide, coupled at a first end to the electromagnetic wave source and at a second end to the exhaust conduit, and extending between the electromagnetic wave source and the exhaust conduit, wherein the electromagnetic wave source is configured to provide the electromagnetic energy, via the wave guide, to exhaust gas and the injected injection substance within the exhaust conduit.

In an Example 13, the system of Example 12, wherein the injection substance comprises at least one of a liquid, a vapor, a solid, and a slurry.

In an Example 14, the system of claim either of Examples 12 or 13, wherein the electromagnetic wave source comprises a microwave source.

In an Example 15, a method of using a system to treat exhaust gas prior to entering a catalytic converter, the method comprising: determining a temperature associated with exhaust gas; determining that the temperature is not a target temperature; causing, in response to determining that the temperature is not a target temperature, an electromagnetic wave source to provide electromagnetic energy, via a wave guide, to an exhaust conduit; and causing an injector to inject an injection substance into the exhaust conduit.

In an Example 16, the method of Example 15, further comprising: determining an additional temperature associated with the exhaust gas; determining that the additional temperature is a target temperature; and causing, in response to determining that the additional temperature is a target temperature, the electromagnetic wave source to: discontinue providing the electromagnetic energy to the exhaust conduit; or provide electromagnetic energy to the exhaust conduit using a modified power level.

In an Example 17, the method of either of Examples 15 or 16, wherein the injection substance comprises at least one of urea and water, In an Example 18, the method of any of Examples 15-17, wherein the target temperature comprises a temperature sufficient to facilitate a reaction between the injection substance and at least one of unburned hydrocarbons (UHC), nitric oxides (NOx), and carbon monoxide (CO).

In an Example 19, the method of any of Examples 15-18, wherein the target temperature comprises at least approximately 600 degrees Celsius.

In an Example 20, the method of any of Examples 15-19, further comprising installing the system into a vehicle having a combustion engine.

In an Example 21, a method of processing exhaust gas, the method comprising: determining a temperature associated with exhaust gas; determining that the temperature is not a target temperature; in response to determining that the temperature is not a target temperature, providing electromagnetic energy, using an electromagnetic wave source and via a wave guide, to an exhaust conduit; and injecting, using an injector, an injection substance into the exhaust conduit.

While multiple embodiments are disclosed, still other embodiments of the presently disclosed subject matter will become apparent to those skilled in the art from the following detailed description, which shows and describes illustrative embodiments of the disclosed invention. Accordingly, the drawings and detailed description are to be regarded as illustrative in nature and not restrictive.

BRIEF DESCRIPTION OF THE DRAWINGS

FIG. 6 is a flow diagram depicting an illustrative method of processing exhaust gas, in accordance with embodiments of the invention While the disclosed subject matter is amenable to various modifications and alternative forms, specific embodiments have been shown by way of example in the drawings and are described in detail below. The intention, however, is not to limit the subject matter disclosed herein to the particular embodiments described. On the contrary, the disclosure is intended to cover all modifications, equivalents, and alternatives falling within the scope of the subject matter disclosed herein, and as defined by the appended claims.

As used herein in association with values (e.g., terms of magnitude, measurement, and/or other degrees of qualitative and/or quantitative observations that are used herein with respect to characteristics (e.g., dimensions, measurements, attributes, components, etc.) and/or ranges thereof, of tangible things (e.g., products, inventory, etc.) and/or intangible things (e.g., data, electronic representations of currency, accounts, information, portions of things (e.g., percentages, fractions), calculations, data models, dynamic system models, algorithms, parameters, etc.), "about" and "approximately" may be used, interchangeably, to refer to a value, configuration, orientation, and/or other characteristic that is equal to (or the same as) the stated value, configuration, orientation, and/or other characteristic or equal to (or the same as) a value, configuration, orientation, and/or other characteristic that is reasonably close to the stated value, configuration, orientation, and/or other characteristic, but that may differ by a reasonably small amount such as will be understood, and readily ascertained, by individuals having ordinary skill in the relevant arts to be attributable to measurement error; differences in measurement and/or manufacturing equipment calibration; human error in reading and/or setting measurements; adjustments made to optimize performance and/or structural parameters in view of other measurements (e.g., measurements associated with other things); particular implementation scenarios; imprecise adjustment and/or manipulation of things, settings, and/or measurements by a person, a computing device, and/or a machine; system tolerances; control loops; machine-learning; foreseeable variations (e.g., statistically insignificant variations, chaotic variations, system and/or model instabilities, etc.); preferences; and/or the like.

As used herein, the term "optimal" refers to a value, conclusion, result, setting, circumstance, and/or the like, that may facilitate achieving a particular objective, and is not meant to necessarily refer to a single, most appropriate, value, conclusion, result, setting, circumstance, and/or the like. That is, for example, an optimal value of a parameter may include any value of that parameter that facilitates achieving a result (e.g., a segmentation that is more appropriate for an image than the segmentation achieved based on some other value of that parameter). Similarly, the term "optimize" refers to a process of determining or otherwise identifying an optimal value, conclusion, result, setting, circumstance, and/or the like.

Although the term "block" may be used herein to connote different elements illustratively employed, the term should not be interpreted as implying any requirement of, or particular order among or between, various blocks disclosed herein. Similarly, although illustrative methods may be represented by one or more drawings (e.g., flow diagrams, communication flows, etc.), the drawings should not be interpreted as implying any requirement of, or particular order among or between, various steps disclosed herein. However, certain embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items, and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information.

The terms "upstream" and "downstream," as used herein, are used in the manner generally understood by those having ordinary skill in the relevant arts. That is, for example, "upstream" and "downstream" refer to relative positions in the context of a direction of flow of exhaust gas. Thus, for example, a component that is downstream of an internal combustion engine and upstream from a catalytic converter is positioned between the internal combustion engine and catalytic converter such that exhaust gases flowing from the internal combustion engine reach the component before reaching the catalytic converter.

DETAILED DESCRIPTION

Embodiments of the invention provide facilitate heating of a fluid (e.g., exhaust gas, air, etc.) to facilitate, reducing emissions and/or light-off times associated with internal combustion (IC) engines with catalytic converters. According to embodiments, an electromagnetic wave source is used to emit electromagnetic radiation, which is used to irradiate exhaust gas coming from an internal combustion engine. In embodiments, the electromagnetic radiation may be microwave radiation. This causes dielectric heating of the exhaust gas, which impinges on the catalytic converter downstream, thereby heating the catalytic converter. When an engine is cold-started, it may take some time for the catalytic converter to warm up and start treating the pollutants present in the exhaust gas (or start treating the pollutants with a desired efficiency), and embodiments of the invention may facilitate reducing that time (and associated emissions) by heating the exhaust gas.

Water is typically a major component of IC engine exhaust, and is commonly known to have dipole moment, e.g., are polar molecules, meaning that it can be irradiated with microwave radiation to produce dielectric heating (the working principle of microwave ovens). Other typical components of spark-ignition engines like Propylene and Toluene also have dipole moment, and some others are susceptible to polarization under electromagnetic fields. Therefore, irradiating IC engine exhaust gas results in dielectric heating of some of its components. This heated gas impinges on the catalytic converter reaction surfaces immediately downstream, heating them. The more power the microwave or other electromagnetic source provides, the more heated the exhaust gas gets, and the more quickly the catalytic converter is warmed up.

In embodiments, an exhaust system is configured such that, when the engine is cold-started, the microwave source switches on and heats up the exhaust gas going to the converter. The microwave source may be configured to shut off or remain operational at a power level less than or equal to an initial power level (e.g., the power level used to heat up the exhaust gas upon start-up) in response to a control unit determining, based on information received from a sensor (e.g., a temperature sensor), that the converter has reached a sufficient temperature (e.g., a predetermined, specified, temperature at which operation is optimal and/or possible). Where the microwave remains on, the microwave may be configured to continue heating the exhaust gas, thereby operating the catalytic converter at a higher temperature and a higher reaction rate than normal. In this manner, embodiments of the invention may facilitate use of catalytic converters that are shorter than those used in conventional exhaust systems.

In embodiments, the electromagnetic wave source may be used to heat liquid that is injected into the exhaust gas. Additionally or alternatively, other heat sources may be used to heat the liquid to a certain temperature or temperature range, e.g., a temperature at which the liquid is reactive. In this manner, embodiments of the invention may assist in further removing pollutants from exhaust gas. In embodiments, for example, a heat source (e.g., an electromagnetic wave source) may be configured to heat a liquid to a temperature that is greater than or equal to approximately 600 degrees Celsius. In embodiments, the heat source may be configured to heat the liquid to a temperature that is greater than or equal to approximately 600 degrees Celsius and that is less than or equal to approximately 1200 degrees Celsius.

Embodiments of the exhaust system described herein may be used in gasoline engines and/or diesel engines. Typically, a three-way catalytic converter is fitted to a gasoline engine, while diesel engines typically are fitted with two-way converters, which only oxidize UHC's and CO, and do not treat NOx. Additionally, diesels tend to run lean, and their exhaust is cooler than gasoline engines, especially while idling. This causes the light-off time to be even greater, resulting in more emissions. Diesels also emit more significant quantities of particulate matter (PM) than gasoline engines, (e.g., soot). Conventional diesel catalytic converters cannot treat PM, but embodiments of the system described herein may be used to produce high enough temperatures in a catalytic converter to facilitate oxidizing more PM, thereby potentially reducing the presence of PM in exhaust being emitted into the environment. According to embodiments, conventional catalytic converters may be fitted with an RF wave source (e.g., a magnetron) and a waveguide, thereby facilitating adaption of existing catalytic converters to include one or more aspects of components of the invention described herein, (e.g., rather than requiring a redesigned catalytic converter, etc.).

Figure 1:
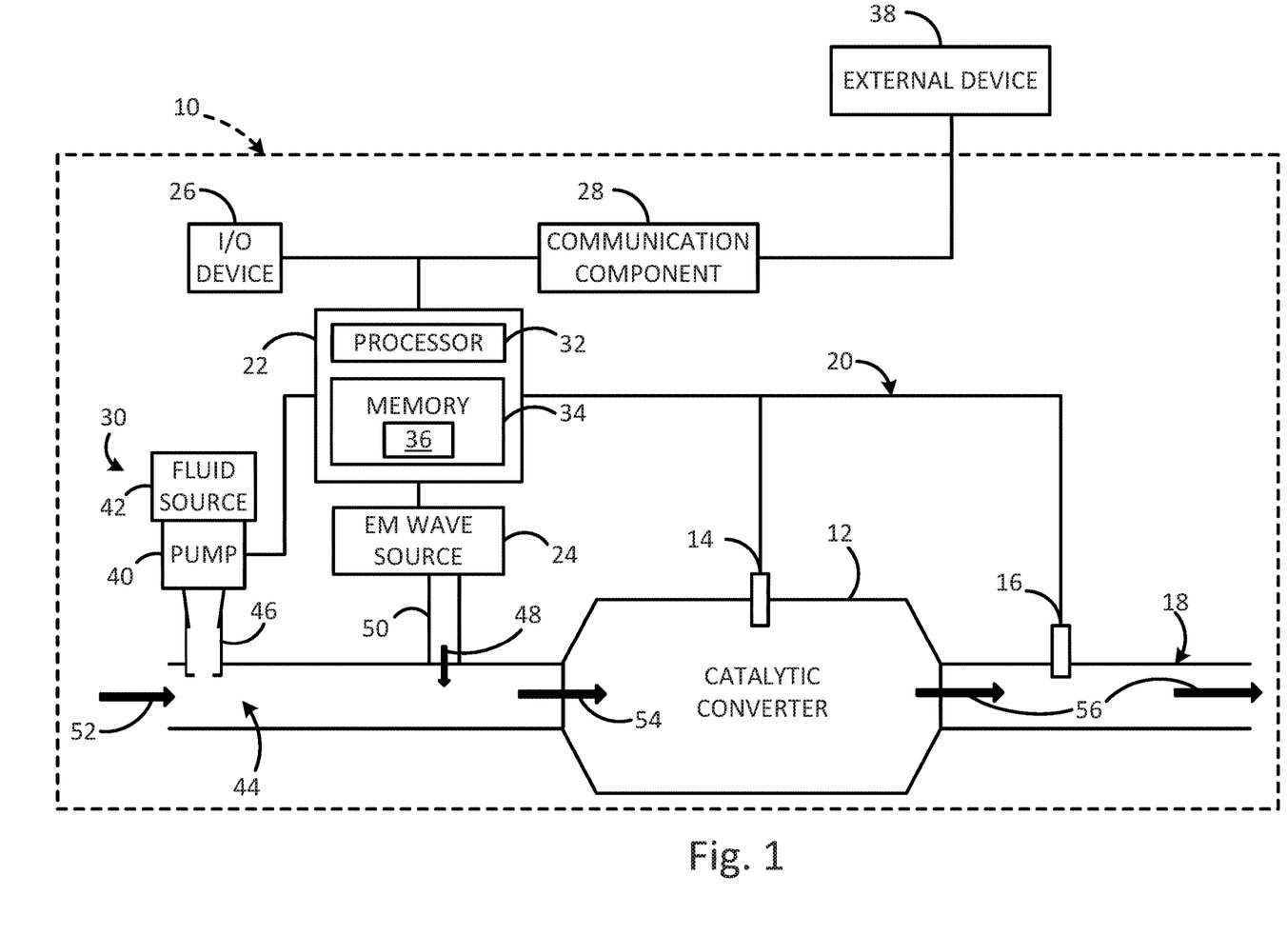
FIG. 1 is a schematic block diagram of an illustrative operating environment having an exhaust system, in accordance with embodiments of the invention.

FIG. 1 is a schematic block diagram of an illustrative operating environment having an exhaust system 10, in accordance with embodiments of the invention. The system 10 includes a catalytic converter 12. The system 10 may include a temperature sensor 14 associated with the catalytic converter 12. According to embodiments, as shown in FIG. 1, a gas sensor 16 may be associated with a portion of the system 10 downstream of the catalytic converter 12 such as, for example, an exhaust gas conduit 18 (e.g., an exhaust pipe, tail pipe, etc.), and may be configured to detect any number of different types of gas such as, for example, UHCs, CO, NOX, and/or the like. In embodiments, the gas sensor 16 may include one or more sensing devices. For example, in embodiments, a separate sensing device may be used to detect each of two or more types of gas and/or other pollutants. Embodiments of the system 10 may include the temperature sensor 14, the gas sensor 16, both of these sensors 14 and 16, or neither of these sensors 14 and 16.

In embodiments, the system may include (in addition to, or in lieu of a gas sensor 16) any number of different types of sensors configured to detect any number of different types of pollutants (e.g., particulates, gases, liquids, etc.). A particle detector may, for example, be a device and/or system configured to perform real-time particle detection, counting, and/or analysis. In embodiments, for example, a particle detector may include an optical sensor assembly. In embodiments, for example, the control unit 22 may communicate with the particle detector to coordinate measurements, control the particle detector, and/or the like. In embodiments, a particle detector may include a filter and/or any number of different types of spectroscopy systems such as, for example, laser systems. In embodiments, the particle detector may include a microscope, camera, and/or other viewing/imaging devices.

As shown in FIG. 1, the temperature sensor 14 and the gas sensor 16 may be operatively coupled (e.g., via circuitry 20) to a control unit 22. In embodiments, one or more sensors (e.g., the temperature sensor 14, the gas sensor 16, etc.) may be operatively coupled to the control unit via a wired connection, a wireless connection, and/or a combination of wired and wireless connections. In embodiments, a first component of a system is operatively coupled to a second component of a system if the first and second components are configured to interact in some way that contributes to one or more aspects of an operation of the system. Components of a system may be operatively coupled by being electrically coupled, communicatively coupled, and/or the like.

For example, a first component may interact with a second component via a power link (e.g., configured to facilitate power being provided from one component to the other) and/or a communication link (e.g., configured to facilitate communication in at least one direction between the components). In embodiments, a link (e.g., a communication link and/or a power link) may be, or include, a wireless communication link such as, for example, a short-range radio link, such as Bluetooth, IEEE 802.11, a proprietary wireless protocol, a wireless power link (e.g., an inductive and/or RF charging link), and/or the like. In embodiments, for example, a communication link may utilize Bluetooth Low Energy radio (Bluetooth 4.1), or a similar protocol, and may utilize an operating frequency in the range of 2.40 to 2.48 GHz.

The term "link" may refer to an ability to communicate some type of information and/or energy (e.g., energy for powering a device) in at least one direction between at least two devices (e.g., two components of the system 10, a component of the system 10 and a component external to the system 10, etc.), and should not be understood to be limited to a direct, persistent, or otherwise limited communication and/or power channel. That is, according to embodiments, a link may be a persistent communication and/or power link, an intermittent communication and/or power link, an ad-hoc communication and/or power link, and/or the like. A link may refer to direct communications between a first device and a second device, and/or indirect communications and/or power that travel between the first device and the second device via at least one other device (e.g., a repeater, router, hub, and/or the like). A link may facilitate uni-directional and/or bi-directional communication and/or power exchange between two or more devices. In embodiments, for example, data and/or control signals may be transmitted, via a link, between two or more devices to coordinate the functions of the devices.

The control unit 22 may include one or more devices configured to provide power and/or control to, and/or receive power and/or information from, one or more components of the system 10. In embodiments, as shown in FIG. 1 for example, the control unit 22 (one or more aspects of which may be referred to as a power controller) may be operatively coupled to the temperature sensor 14, the gas sensor 16, and/or any number of other sensors. The control unit 22 may also be operatively coupled to an electromagnetic (EM) wave source 24 (e.g., a microwave source, a radio frequency (RF) source, etc.). The EM wave source 24 may be, be similar to, include, or be included in, any number of different types of EM wave sources.

In embodiments, for example, the EM wave source may include a microwave source such as, for example, a commercial magnetron (such as may be used in a household microwave oven). The EM wave source 24 may represent, in embodiments, more than one EM wave source. For example, the EM wave source 24 may include a microwave source and an EM wave source that is configured to provide targeted EM energy—e.g., EM energy having characteristics configured to facilitate targeting certain pollutants, types of pollutants, and/or the like. For example, in embodiments, the EM wave source 24 may include EM wave sources, each configured to provide EM radiation at a wavelength associated with an absorption spectrum of one of a number of target species (e.g., NOx, CO, etc.). In this manner, embodiments of the invention may facilitate specifically heating certain target species, which may result in an increase of a rate of reaction on the catalyst surface of the target species, thereby facilitating the removal, or partial removal, of the target species from the exhaust gas. The control unit 22 may be used, for example, to control the power at which the EM wave source 24 operates, thereby facilitating controlling, or otherwise influencing, the temperature of the exhaust gas entering the catalytic converter 12. The exhaust gas entering the catalytic converter may include, for example, exhaust gas, treated gas, heated gas, and/or the like.

In embodiments, for example, the EM wave source 24 (e.g., microwave source) may apply microwave radiation 48 through a waveguide 50 to exhaust gas 52 from an engine (not shown); thereby heating the exhaust gas 52 to create heated gas 54. The heated gas 54 is conveyed through, and processed by, the catalytic converter 12 to provide processed exhaust gas 56 to the atmosphere. During operation, heating the exhaust gas using a microwave source 24 may cause an increase in the performance of the catalytic converter 12 by boosting its reaction rate, meaning that a shorter/smaller catalytic converter than those used in conventional systems can be used. Since the working components of the catalytic converter 12 typically are precious metals like platinum, palladium, silver and gold, embodiments of the invention may facilitate significant cost savings.

The sensors 14 and 16 may refer to one or more sensors operatively coupled to the control unit 22. The sensors may be configured to directly or indirectly measure a temperature associated with exhaust gas (e.g., exhaust gas temperature, engine temperature, the temperature of one or more portions/regions of the exhaust conduit and/or catalytic converter, catalyst temperature, etc.), detect particles and/or gas, measure exhaust gas velocity, mass flow rate, and/or any number of other parameters, and may include any number of different types of sensors capable of facilitating such measurements. In embodiments, the control unit 22 may be configured to determine a composition of the exhaust gas entering and/or exiting the catalytic converter 12, a temperature of a fluid (e.g., a fluid to be injected such as, for example, urea; exhaust gas; etc.), density, pressure, and/or any number of other characteristics of fluid, ambient environment, and/or the like. These characteristics may be used by the control unit 22 to determine an appropriate output level of the EM wave source 24, an appropriate amount of fluid (e.g., reducing agent) to inject, an appropriate rate at which to inject the fluid, and/or the like. These and other determinations may be determined based on user input, input from the sensors 14 and/or 16, input from additional sensors (not shown), and/or the like.

As shown in FIG. 1, the control unit 22 may be configured to provide power to, communicate with, and/or control functional components of the system 10. As shown, the functional components may include the temperature sensor 14, the gas sensor 16, the EM wave source 24, an input/output (I/O) device 26, a communication component 28, an injector 30, and/or the like. According to embodiments, the functional components may include any one or more of the components depicted in FIG. 1, and may, in embodiments include any number of components not depicted in FIG. 1. In embodiments, the control unit may include a processing unit 32 configured to communicate with a memory device 34 to execute computer-executable instructions 36 stored in the memory device 34. For example, in response to determining an appropriate operational parameter (e.g., based on information received from sensors, user input, etc.), the control unit 22 may be configured to provide an operating instruction to one or more components of the system 10 such as, for example the EM wave source 24, the I/O device 26, the communication component 28, and/or the injector 30. In this manner, embodiments of the system 10 include a control unit 22 that facilitates controlling the system and adjusting the operation of the system 10 based on the performance of the system, environmental factors, and/or the like.

In embodiments, the control unit 22 may be, include, or be included in one or more Field Programmable Gate Arrays (FPGAs), one or more Programmable Logic Devices (PLDs), one or more Complex PLDs (CPLDs), one or more custom Application Specific Integrated Circuits (ASICs), one or more dedicated processors (e.g., microprocessors), one or more central processing units (CPUs), software, hardware, firmware, or any combination of these and/or other components. Although the control unit 22 is referred to herein in the singular, the control unit 22 may be implemented in multiple instances, distributed across multiple computing devices, instantiated within multiple virtual machines, and/or the like.

The I/O device 26 may refer to one or more I/O devices 26 and may include any number of different types of I/O devices such as, for example, light indicators, speakers, buttons, keyboards, mice, and/or the like. The I/O device 26 may be configured to present information to a user and/or receive input from a user. According to embodiments, the I/O device 26 may be configured to indicate a device status (e.g., on/off, active, error, etc.), receive a command from a user, and/or the like. In embodiments, the I/O device 26 may include a touch-screen interface, an LED, and/or the like.

The communication component 28 may include hardware, software, and/or firmware configured to facilitate communications between the system 10 (and/or a component of the system 10) and an external device 38. The external device 38 may be external to the system 10 and/or external to one or more components of the system 10. For example, in embodiments in which the system 10 is implemented as part of an automobile, the control unit 22 may be, include, or be included within a computer disposed within the automobile. The computer may be configured to control, receive information from, provide power and/or information to, or otherwise interact with, any number of different components of the automobile such as, for example, one or more aspects of the engine, one or more aspects of the exhaust system, one or more aspects of a cabin climate control system, one or more aspects of a navigation system, and/or the like. In embodiments, the communication component 28 may include one or more antennae, one or more receivers, one or more transmitters, one or more transceivers, and/or the like; and may be configured to communicate using any number of different wired and/or wireless communication techniques.

Data and/or control signals may be transmitted between the system 10 and the external device 38 to coordinate the functions of the system 10 and the external device 38. In embodiments, for example, the system 10 may be configured to be programmed and/or otherwise controlled by the external device 38, receive information from the external device 38, provide information to the external device 38, and/or the like. That is, for example, in embodiments, the external device 38 may be, or include, a user interface that facilitates providing information about the operation of the system 10 to a user, and that, in embodiments, may facilitate enabling a user to control, program, and/or otherwise influence the operation of one or more components of the system 10. The user interface may be configured to enable a user to input various operational parameters, activate and/or deactivate one or more components of the system 10, retrieve operational and/or environmental parameter information from the system 10, and/or the like.

As shown in FIG. 1, the injector 30 may include a pump 40 coupled to a fluid source 42 and configured to facilitate providing fluid from the fluid source to an exhaust gas conduit portion 44 via injection conduit 46. In embodiments, another type of injecting mechanism may be used to inject a slurry, solid particles, and/or the like. The term "injection substance" is used herein to describe any substance (e.g., a solid, liquid, vapor, etc, that is configured to be injected into gas exhaust, in accordance with embodiments of the invention. In embodiments, the injection substance includes a reducing agent such as, for example, urea. That is, in embodiments, for example, the fluid may include AdBlue® available from Yara UK Limited, of Lincolnshire, England. In embodiments, the injector 30 may include any number of different types of injectors, and the pump 40 may be controlled by the control unit 22, e.g., to facilitate adjusting an injection rate (e.g., mass flow rate) in response to determining that an appropriate injection rate determined based on one or more aspects of the performance of the system 10 differs from the current injection rate. The fluid source 42 may include any number of different reservoirs, plumping circuits, and/or the like.

The illustrative operating environment depicted in FIG. 1 is not intended to suggest any limitation as to the scope of use or functionality of embodiments of the present disclosure. The illustrative operating environment also should not be interpreted as having any dependency or requirement related to any single component or combination of components illustrated therein. Additionally, various components depicted in FIG. 1 may be, in embodiments, integrated with various ones of the other components depicted therein (and/or components not illustrated), all of which are considered to be within the ambit of the present invention.

Figure 2:
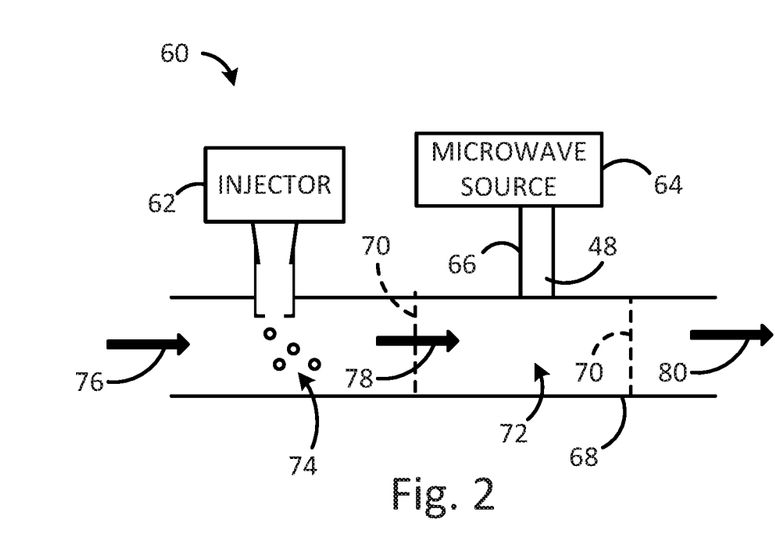
FIG. 2 is a schematic block diagram depicting an illustrative exhaust system, in accordance with embodiments of the invention.

As previously mentioned, an injector may be used to introduce an injection substance into the stream of exhaust gas. FIG. 2 is a schematic block diagram depicting an illustrative exhaust system 60, in accordance with embodiments of the invention. According to embodiments, the exhaust system 60 (or one or more components thereof) may be, be similar to, include, or be included in the exhaust system 10 depicted in FIG. 1 (or one or more components thereof). In embodiments, the exhaust system 60 may include a catalytic converter (not shown), positioned downstream of the components depicted in FIG. 2, which are positioned downstream of an internal combustion engine (not shown).

An injector 62 is positioned upstream, of a microwave source 64, which emits microwave energy through a waveguide 66 to an exhaust conduit 68. A mesh material 70 may be placed on opposites sides of the waveguide 66 to contain microwave energy to the microwave region 72 disposed between the two portions of mesh material 70. The injector 62 may be configured to inject an injection substance 74 that may be, or include, a liquid, a microwave absorbing sold particle, a slurry, and/or the like, into the exhaust conduit 68. Examples of injection substances that may be used include, but are not limited to, AdBlue®, water, water with urea, ammonia, ethanol, methanol, gasoline, microwave absorbent particles, and/or combinations thereof. AdBlue® is a commercially available water-urea solution used in passenger diesel cars for NOX reduction which is mostly water and may effectively absorb microwaves and may also clean up NOX better as temperatures increase. The injection substance 74 mixes, reacts, blends, and/or otherwise interacts with, incoming exhaust gas 76 to create treated gas 78. The treated gas 78 is heated with the microwave energy in the microwave region 72 to further increase temperature within in the exhaust conduit 68 and create heated gas 80, which is provided to the catalytic converter.

The illustrative exhaust system 60 depicted in FIG. 2 is not intended to suggest any limitation as to the scope of use or functionality of embodiments of the present disclosure. The illustrative exhaust system 60 also should not be interpreted as having any dependency or requirement related to any single component or combination of components illustrated therein. Additionally, various components depicted in FIG. 2 may be, in embodiments, integrated with various ones of the other components depicted therein (and/or components not illustrated), all of which are considered to be within the ambit of the present invention.

Figure 3:
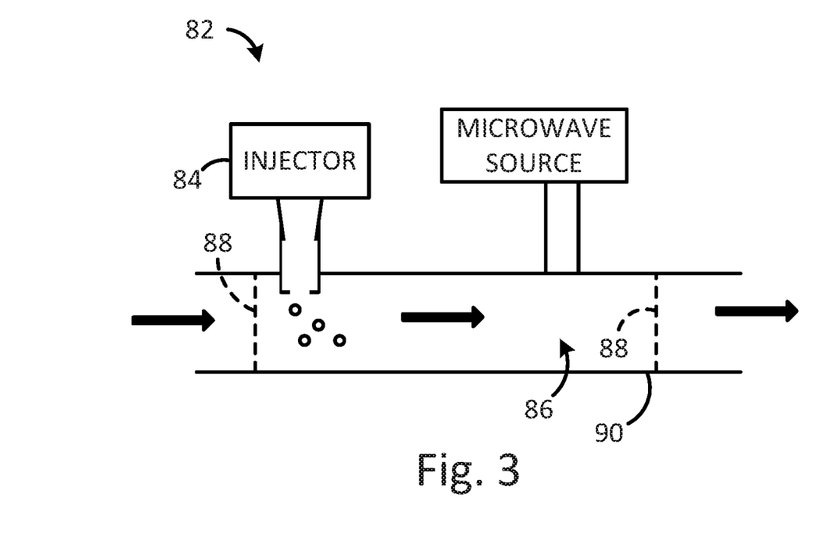
FIG. 3 is a schematic block diagram depicting another illustrative exhaust system, in accordance with embodiments of the invention.

FIG. 3 is a schematic block diagram depicting another illustrative exhaust system 82, in accordance with embodiments of the invention. According to embodiments, the exhaust system 82 (or one or more components thereof) may be, be similar to, include, or be included in the exhaust system 10 depicted in FIG. 1 (or one or more components thereof) and/or the exhaust system 60 depicted in FIG. 2 (or one or more components thereof). In embodiments, the exhaust system 82 may include a catalytic converter (not shown), positioned downstream of the components depicted in FIG. 3, which are positioned downstream of an internal combustion engine (not shown). As shown in FIG. 3, the system 82 may be similar to the system 60 depicted in FIG. 2, with the exception that the location of the injector 84 has been altered. For example, the injector 84 is positioned inside of the microwave region 86, bounded by the two portions of mesh material 88. It is contemplated that the injector 84 may be positioned at any number of different locations along the length of the exhaust conduit 90, and/or at various positions around the pipe, and/or at one or multiple locations.

The illustrative exhaust system 82 depicted in FIG. 3 is not intended to suggest any limitation as to the scope of use or functionality of embodiments of the present disclosure. The illustrative exhaust system 82 also should not be interpreted as having any dependency or requirement related to any single component or combination of components illustrated therein. Additionally, various components depicted in FIG. 3 may be, in embodiments, integrated with various ones of the other components depicted therein (and/or components not illustrated), all of which are considered to be within the ambit of the present invention.

Figure 4:
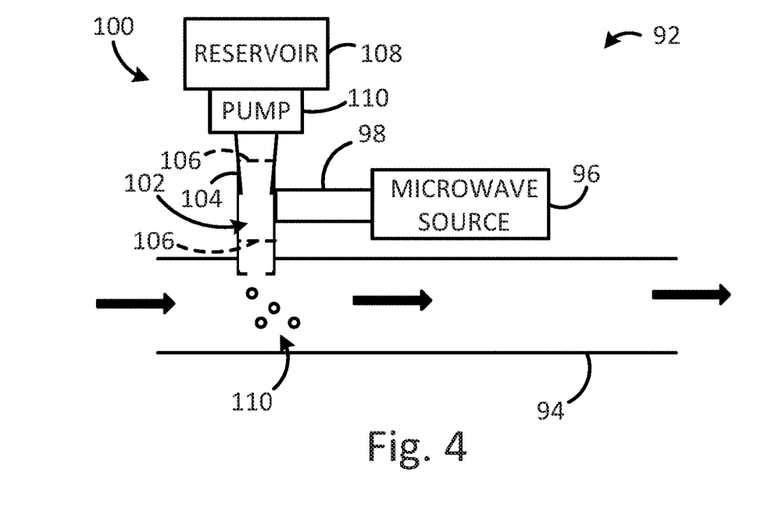
FIG. 4 is a schematic block diagram depicting another illustrative exhaust system, in accordance with embodiments of the invention

FIG. 4 is a schematic block diagram depicting another illustrative exhaust system 92, in accordance with embodiments of the invention. According to embodiments, the exhaust system 92 (or one or more components thereof) may be, be similar to, include, or be included in the exhaust system 10 depicted in FIG. 1 (or one or more components thereof); the exhaust system 60 depicted in FIG. 2 (or one or more components thereof); and/or the exhaust system 82 depicted in FIG. 3 (or one or more components thereof). In embodiments, the exhaust system 92 may include a catalytic converter (not shown), positioned downstream of the components depicted in FIG. 4, which are positioned downstream of an internal combustion engine (not shown). As shown in FIG. 4, the system 92 may be similar to the system 60 depicted in FIG. 2 and/or the system 82 depicted in FIG. 3, except that instead of (or, in embodiments, in addition to) microwaves being applied within the exhaust conduit 94, microwaves are applied, using a microwave source 96 and via a wave guide 98, to injection substance in an injector 100. For example, as shown in FIG. 4, the wave guide 98 may be configured to direct microwaves into a microwave region 102 of a conduit 104 of the injector 100. In embodiments, the microwave region 102 may be bounded by portions of mesh material 106. In embodiments, the wave guide 98 may be configured to (or may include more than one wave guide, at least one of which is configured to) provide microwave energy to a microwave region of a reservoir 108, a pump 110, and/or the like.

The heated fluid 110 may then be pumped into the exhaust conduit 94. In this manner, embodiments of the invention facilitate heating the injection substance prior to injection into the exhaust conduit 94. According to embodiments, the injection substance may be heated to a temperature sufficient to react with at least one of unburned hydrocarbons (UHC), nitric oxides (NOx), and carbon monoxide (CO). For example, the target temperature may be approximately 600 degrees Celsius or greater, a temperature within a range of approximately 600 degrees Celsius to approximately 1000 degrees Celsius, and/or other target temperature. For example, in embodiments, the target temperature may be approximately 650 degrees Celsius. In addition to using microwave energy to heat the fluid, other heat sources may be used such as, for example, electric heating, conductive heating, other forms of radiation and/or the like.

The illustrative exhaust system 92 depicted in FIG. 4 is not intended to suggest any limitation as to the scope of use or functionality of embodiments of the present disclosure. The illustrative exhaust system 92 also should not be interpreted as having any dependency or requirement related to any single component or combination of components illustrated therein. Additionally, various components depicted in FIG. 4 may be, in embodiments, integrated with various ones of the other components depicted therein (and/or components not illustrated), all of which are considered to be within the ambit of the present invention.

Figure 5:
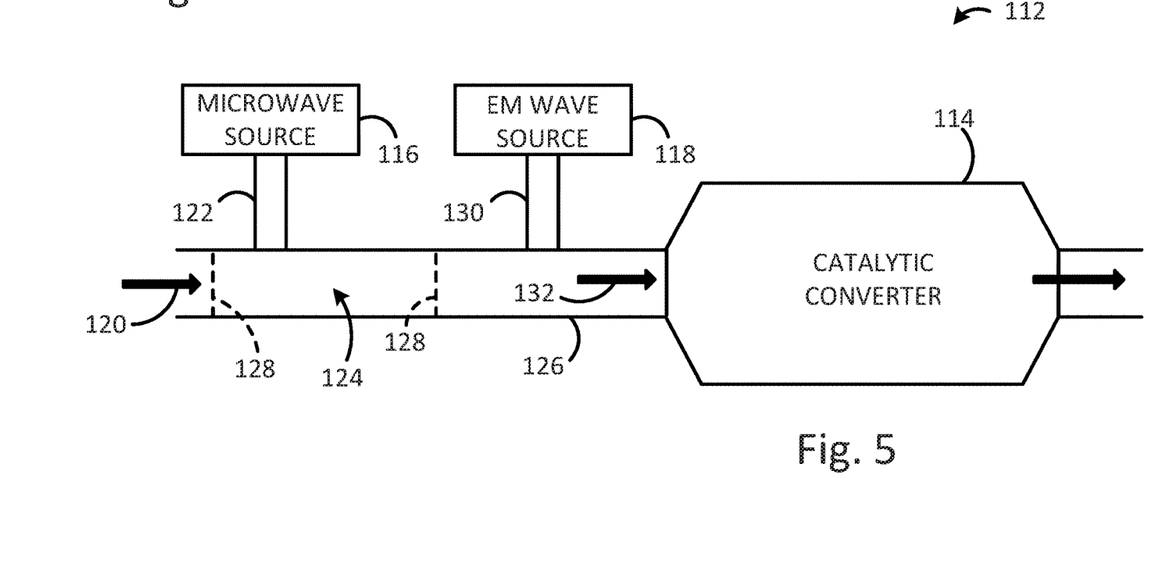
FIG. 5 is a schematic block diagram depicting another illustrative exhaust system, in accordance with embodiments of the invention.

FIG. 5 is a schematic block diagram depicting another illustrative exhaust system 112, in accordance with embodiments of the invention. According to embodiments, the exhaust system 112 (or one or more components thereof) may be, be similar to, include, or be included in the exhaust system 10 depicted in FIG. 1 (or one or more components thereof); the exhaust system 60 depicted in FIG. 2 (or one or more components thereof); the exhaust system 82 depicted in FIG. 3 (or one or more components thereof); and/or the exhaust system 92 depicted in FIG. 4 (or one or more components thereof). In embodiments, the exhaust system 112 may include a catalytic converter 114, positioned downstream of one or more EM wave sources 116, 118, which are positioned downstream of an internal combustion engine (not shown). As shown in FIG. 5, the system 112 may be similar to the system 60 depicted in FIG. 2, the system 82 depicted in FIG. 3, and/or the system 92 depicted in FIG. 4, except that, in addition to microwaves being applied within the exhaust conduit 94, one or more additional EM wave sources 118 may be used to apply energy configured for target species.

The EM wave source(s) 118 may be used, for example, to irradiate exhaust gas 120 with particular wavelengths which target species within the exhaust gas will absorb and which will increase reactivity. The EM wave source(s) 118 may be placed immediately upstream of the catalytic converter 114 so that these species will enter the catalytic converter 114 at increased reactivity, meaning catalysis action will be increased. In this manner, embodiments of the invention may facilitate using less catalyst than in conventional systems, thereby also potentially leading to cost savings. According to embodiments, the EM wave source(s) 118 may include infrared (IR) and/or visible light sources. Examples of different species and their absorption wavelength ranges (in microns) include: NO2 (3.54 to 3.40, 9 to 6.5, 13.5 to 17, and 1250 (in EHF range) to 45; NO (1000 (EHF) to 100, 6 to 4.5, and 2.9 to 2.5), and CO (5.7 to 4.4, 2.6 to 2.2, 1.6 to 1.5, and 1.25 to 1.18).

As shown in FIG. 5, in embodiments, microwave energy may be applied, using a microwave source 116 and via a wave guide 122, to a microwave region 124 of an exhaust conduit 126. In embodiments, the microwave region 124 may be bounded by portions of mesh material 128. One or more EM wave sources 118 may be configured to provide EM energy to the exhaust conduit 126 via a wave guide 130. In embodiments, the wave guide 130 may be configured to provide the EM energy to the microwave region 124 and/or to a region of the exhaust conduit 126 other than the microwave region 124. The heated injection substance 132 may then be provided to the catalytic converter 114.

The illustrative exhaust system 112 depicted in FIG. 5 is not intended to suggest any limitation as to the scope of use or functionality of embodiments of the present disclosure. The illustrative exhaust system 112 also should not be interpreted as having any dependency or requirement related to any single component or combination of components illustrated therein. Additionally, various components depicted in FIG. 5 may be, in embodiments, integrated with various ones of the other components depicted therein (and/or components not illustrated), all of which are considered to be within the ambit of the present invention.

Figure 6:
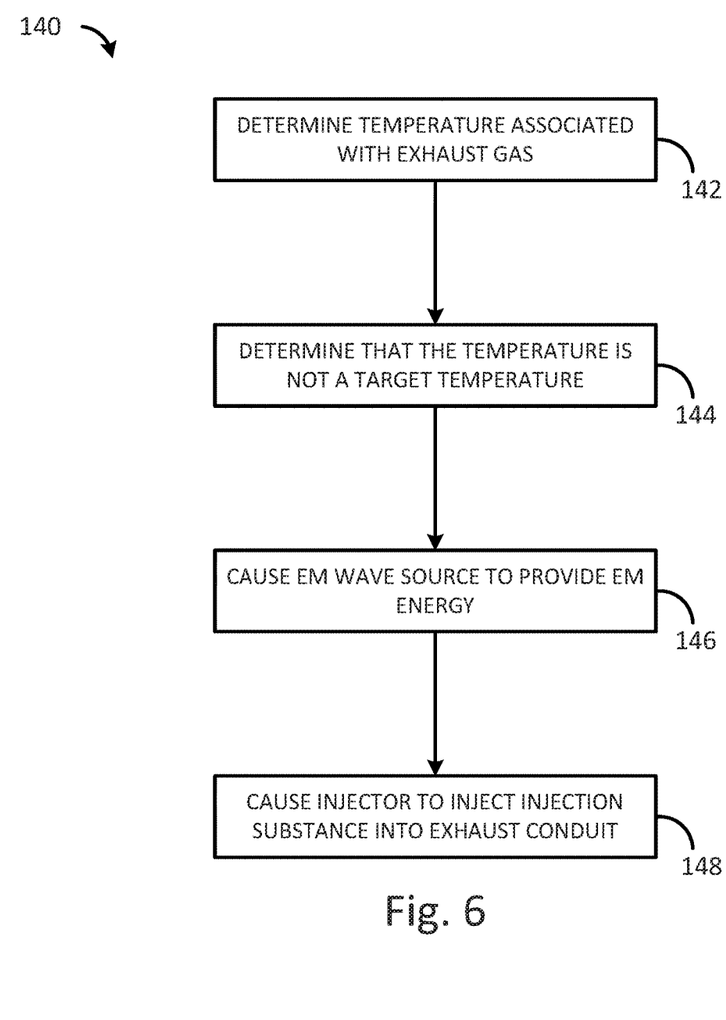

Systems, devices, and techniques for processing exhaust gases have been described above. Embodiments of the invention further include one or more methods of processing exhaust gases, in accordance with embodiments described herein. FIG. 6 is a flow diagram depicting an illustrative method 140 of using a system (e.g., one or more components of any of the systems described herein) to process exhaust gas, in accordance with embodiments of the invention. Embodiments of the method 140 include determining a temperature associated with exhaust gas (block 142); determining that the temperature is not a target temperature (block 144); and causing, in response to determining that the temperature is not a target temperature, an electromagnetic wave source to provide electromagnetic energy, via a wave guide, to an exhaust conduit (block 146). In embodiments, the method 140 may also include causing an injector to inject an injection substance into the exhaust conduit.

According to various embodiments, the method 140 may include determining an additional temperature associated with the exhaust gas; determining that the additional temperature is a target temperature; and causing, in response to determining that the additional temperature is a target temperature, the electromagnetic wave source to: discontinue providing the electromagnetic energy to the exhaust conduit; or provide electromagnetic energy to the exhaust conduit using a modified power level. In embodiments, as described herein, the injection substance may include water, urea, and/or the like. In embodiments, the target temperature may include a temperature sufficient to facilitate a reaction between the injection substance and at least one of unburned hydrocarbons (UHC), nitric oxides (NOx), and carbon monoxide (CO). For example, in embodiments, the target temperature comprises at least approximately 600 degrees Celsius.

According to various embodiments of the disclosed subject matter, any number of the components depicted in FIG. 1 (e.g., the control unit 22, the EM wave source 24, the I/O device 26, the communication component 28, the external device 38, and/or aspects of one or more of these); the components depicted in FIG. 2 (e.g., the injector 62, the microwave source 64, and/or aspects of one or more of these); the components depicted in FIG. 3 (e.g., the injector 84, the microwave source, and/or aspects of one or more of these); the components depicted in FIG. 4 (e.g., the injector 100, the microwave source 96, and/or aspects of one or more of these); and/or the components depicted in FIG. 5 (e.g., the microwave source 116, the EM wave source 118, and/or aspects of one or more of these) may be implemented on one or more computing devices. A computing device may include any type of computing device suitable for implementing aspects of embodiments of the disclosed subject matter. Examples of computing devices include specialized computing devices or general-purpose computing devices such "workstations," "servers," "laptops," "desktops," "tablet computers," "hand-held devices," "portable sampling devices," "computers," "controllers," and the like, all of which are contemplated within the scope of FIGS. 1-5 with reference to various components of embodiments of the invention.

In embodiments, a computing device includes a bus that, directly and/or indirectly, couples one or more of the following devices: a processing unit (e.g., the processor 32 depicted in FIG. 1), a memory (e.g., the memory device 34 depicted in FIG. 1), an input/output (I/O) port, an I/O component (e.g., the I/O device 26 depicted in FIG. 1), and a power supply. Any number of additional components, different components, and/or combinations of components may also be included in the computing device. The I/O component may include a presentation component configured to present information to a user such as, for example, a display device, a speaker, a printing device, and/or the like, and/or an input component such as, for example, a microphone, a joystick, a satellite dish, a scanner, a printer, a wireless device, a keyboard, a pen, a voice input device, a touch input device, a touch-screen device, an interactive display device, a mouse, and/or the like.

The bus represents what may be one or more busses (such as, for example, an address bus, data bus, or combination thereof). Similarly, in embodiments, the computing device may include a number of processing units, a number of memory components, a number of I/O ports, a number of I/O components, and/or a number of power supplies. Additionally any number of these components, or combinations thereof, may be distributed and/or duplicated across a number of computing devices.

In embodiments, the memory includes computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; and/or any other medium that can be used to store information and can be accessed by a computing device such as, for example, quantum state memory, and/or the like. In embodiments, the memory stores computer-executable instructions for causing the processor to implement aspects of embodiments of system components discussed herein and/or to perform aspects of embodiments of methods and procedures discussed herein.

The computer-executable instructions may include, for example, computer code, machine-useable instructions, and the like such as, for example, program components capable of being executed by one or more processors associated with the computing device. Program components may be programmed using any number of different programming environments, including various languages, development kits, frameworks, and/or the like. Some or all of the functionality contemplated herein may also, or alternatively, be implemented in hardware and/or firmware.

Various modifications and additions can be made to the exemplary embodiments discussed without departing from the scope of the present invention. For example, while the embodiments described above refer to particular features, the scope of this disclosure also includes embodiments having different combinations of features and embodiments that do not include all of the described features. For example, the system may be used in a vehicle or in other applications where an internal combustion engine and a catalytic converter are used. Where fluid is injected with an injector, one or more injectors may be placed in any number of different locations. In embodiments, the heating of the fluid may be performed by microwave, targeted electromagnetic radiation, and/or other types of heating. Accordingly, the scope of the present invention is intended to embrace all such alternatives, modifications, and variations as fall within the scope of the claims, together with all equivalents thereof.

We claim:

1. A system, comprising:
   an exhaust conduit coupled, at a first end of the exhaust conduit, to an internal combustion engine;
   a catalytic converter coupled to a second end of the exhaust conduit;
   an electromagnetic wave source configured to emit electromagnetic energy;
   a wave guide, coupled at a first end to the electromagnetic wave source and at a second end to the exhaust conduit, and extending between the electromagnetic wave source and the exhaust conduit, wherein the electromagnetic wave source is configured to provide the electromagnetic energy, via the wave guide, to exhaust gas traveling through the exhaust conduit;
   wherein the exhaust conduit is configured to contain the electromagnetic energy within the exhaust conduit; an injector positioned upstream of the location at which the wave guide is coupled to the exhaust conduit, wherein the injector is configured to inject an injection substance into the exhaust conduit; and a first portion of mesh material disposed within the exhaust conduit and upstream of a location at which the wave guide is coupled to the exhaust conduit; and a second portion of the mesh material disposed is within the exhaust conduit and downstream of the location at which the wave guide is coupled to the exhaust conduit; wherein the injector is positioned to inject the injection substance into the exhaust conduit downstream of the first portion of mesh material.

2. The system of claim 1, further comprising mesh material disposed within the exhaust conduit to contain the electromagnetic energy within the exhaust conduit.

3. The system of claim 2, wherein a first portion of the mesh material is positioned upstream of the location at which the wave guide is coupled to the exhaust conduit; and a second portion of the mesh material is positioned downstream of the location at which the wave guide is coupled to the exhaust conduit.

4. The system of claim 1, wherein the injection substance is a reducing agent.

5. The system of claim 4, wherein the reducing agent comprises urea.

6. The system of claim 1, further comprising an additional electromagnetic wave coupled, via an additional wave guide, to the exhaust conduit.

7. The system of claim 6, wherein the second electromagnetic wave source comprises at least one of a visible light source, an infrared light source, and a radio frequency (RF) wave source.

8. The system of claim 1, wherein the electromagnetic energy comprises microwave energy.

9. The system of claim 8, wherein the electromagnetic wave source comprises a magnetron.

10. An exhaust processing system for use with a catalytic converter that is configured to receive exhaust gas via an exhaust conduit, the system comprising:
    an injector positioned along the exhaust conduit and configured to inject an injection substance into the exhaust conduit; and
    an electromagnetic wave source configured to emit electromagnetic energy; and
    a wave guide, coupled at a first end to the electromagnetic wave source and at a second end to the exhaust conduit, and extending between the electromagnetic wave source and the exhaust conduit, wherein the electromagnetic wave source is configured to provide the electromagnetic energy, via the wave guide, to exhaust gas and the injected injection substance within the exhaust conduit;
    wherein the exhaust conduit is configured to contain the electromagnetic energy within the exhaust conduit; wherein the injector is positioned upstream of the location at which the wave guide is coupled to the exhaust conduit; and a first portion of mesh material disposed within the exhaust conduit and upstream of a location at which the wave guide is coupled to the exhaust conduit; and a second portion of the mesh material disposed is within the exhaust conduit and downstream of the location at which the wave guide is coupled to the exhaust conduit; wherein the injector is positioned to inject the injection substance into the exhaust conduit downstream of the first portion of mesh material.

11. The system of claim 10, wherein the injection substance comprises at least one of a liquid, a vapor, a solid, and a slurry.

12. The method of claim either of claim 10, wherein the electromagnetic wave source comprises a microwave source.

13. A method of using a system of claim 1 to treat the exhaust gas prior to entering the catalytic converter, the method comprising:
    determining a temperature associated with the exhaust gas;
    determining that the temperature is not a target temperature;
    causing, in response to determining that the temperature is not a target temperature, the electromagnetic wave source to provide the electromagnetic energy, via the wave guide, to the exhaust conduit; and
    causing an injector to inject an injection substance into the exhaust conduit.

14. The method of claim 13, further comprising:
    determining an additional temperature associated with the exhaust gas;
    determining that the additional temperature is a target temperature; and
    causing, in response to determining that the additional temperature is a target temperature, the electromagnetic wave source to:
        discontinue providing the electromagnetic energy to the exhaust conduit; or
        provide electromagnetic energy to the exhaust conduit using a modified power level.

15. The method of claim 13, wherein the injection substance comprises at least one of urea and water.

16. The method of claim 13, wherein the target temperature comprises a temperature sufficient to facilitate a reaction between the injection substance and at least one of unburned hydrocarbons (UHC), nitric oxides (NOx), and carbon monoxide (CO).

17. The method of claim 13, wherein the target temperature comprises at least approximately 600 degrees Celsius.

18. The method of claim 13, further comprising installing the system into a vehicle having a combustion engine.

* * * * *